March 5, 1968     N. H. STINGLEY     3,372,220
METHOD OF MOLDING A POLISHING AND DEBURRING WHEEL
Filed April 12, 1965
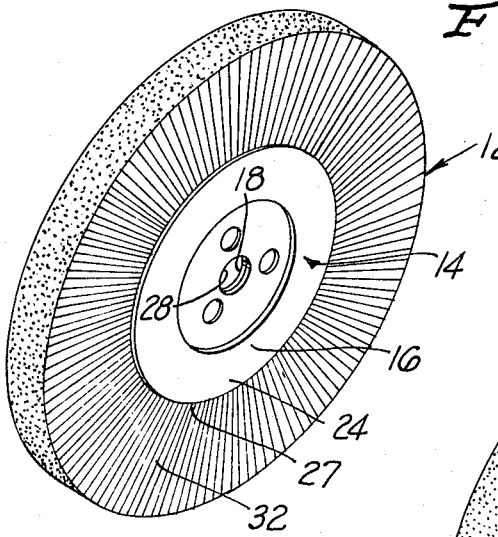
FIG. 1.
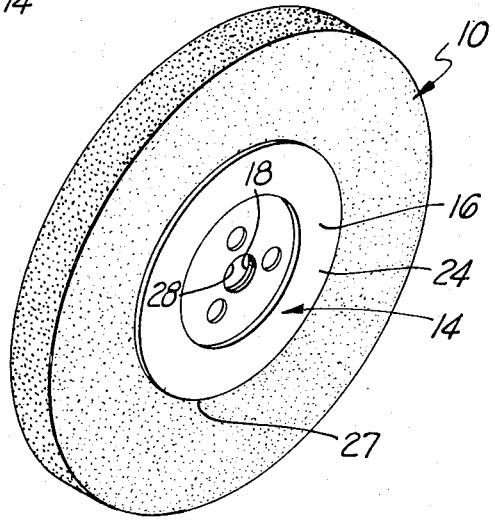
FIG. 2.
FIG. 3.
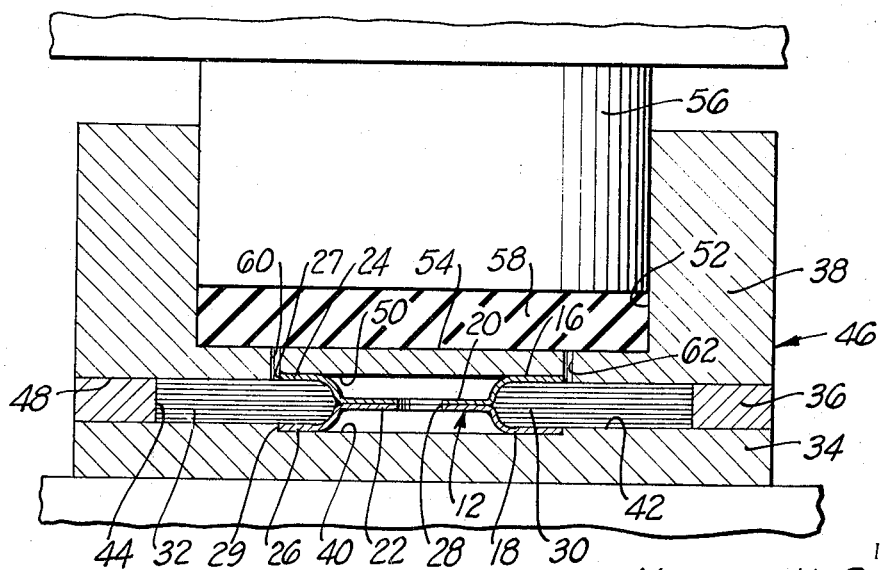
INVENTOR.
NORMAN H. STINGLEY
BY
EDWARD D. O'BRIAN
ATTORNEY

United States Patent Office 3,372,220
Patented Mar. 5, 1968

3,372,220
METHOD OF MOLDING A POLISHING AND DEBURRING WHEEL
Norman H. Stingley, 12801 Woodland Ave., Garden Grove, Calif. 92640
Filed Apr. 12, 1965, Ser. No. 447,166
4 Claims. (Cl. 264—236)

ABSTRACT OF THE DISCLOSURE

A process for making a polishing and deburring wheel is disclosed in which a wheel having a hub and radially extending wire bristles is located in a mold fitting closely against the hub, a material which is thermohardening and which is elastomeric after thermohardening is injected into the mold adjacent to the hub so as to flow outwardly within the mold substantially parallel to the wires in order to prevent deflection of the wires from a substantially radial position.

---

This invention is directed to a method of molding a polishing and deburring wheel, which method is especially directed to the production of a wire wheel having radially positioned wires encased in elastomeric material.

A polishing and deburring wheel comprises a wire wheel mounted upon a hub with the wire encased in elastomeric material and such are known in the art. The production of such wheels is burdensome and time consuming and is not adapted to produce a high quality wheel, for the wires of such a wheel are distorted by the injection of the elastomeric material therein so that the resultant wires are not radially positioned. Since they are not radially positioned, they are unevenly positioned around the periphery of the wheel and tend to be stressed improperly by centrifugal forces so that additional wear occurs upon the wheel. Furthermore, such wear and radially positioning of such wires, after they have been molded in a non-radial position, results in a greater radial dimension in the tip thereof so that such wires extend from the elastomeric material and cause undue scratching of the material applied to the surface of the rotating wheel. Furthermore, the uneven wire concentration in the wheel periphery causes uneven wheel wear.

Accordingly, it is an object of this invention to provide a method for molding a polishing and deburring wheel which includes injecting elastomeric material among the radially extending and positioned wires of the wire wheel, in such a manner that the wires are not displaced from their normal, radial direction.

It is another object of this invention to economically and accurately mold a polishing and deburring wheel so that the wires are evenly positioned around the periphery thereof so as to cause even action of the wires upon the work to which they are applied.

It is a further object of this invention to provide a novel process for producing a polishing and deburring wheel in which the wires therein are encased in elestomeric material, which process is economic so that such wheels may be produced and be made available at minimum cost and which process produces wheels of high quality and long life.

Other objects and advantages of this invention will become apparaent from a study of the following portion of the specification, the claims and the attached drawings in which:

FIG. 1 is an isometric view of a wire polishing and deburring wheel as employed in the process of this invention;

FIG. 2 is an isometric view of a polishing and deburring wheel after having elastomeric material injected therein in accordance with the process of this invention; and FIG. 3 is a side view, taken mostly in section, of a mold employed in the process of this invention showing the wire polishing and deburring wheel positioned therein.

As an aid to understanding this invention it can be stated in essentially summary form that it is directed to a process for producing a wire polishing and deburring wheel having elastomeric material injected therein so as to fully encase each of the wires and accurately retain them in a radial position. The wire wheel which is used as a starting material has a solid hub in which the wires are individually radially secured. The process comprises the placing of one of these wire wheels in a suitable mold, injecting elastomeric material in a plurality of locations immediately adjacent the hub of the wheel to thus cause flow of elastomeric material in a radially outward direction around the wires as it solidly fills the mold cavity and the spaces between the wires, and causing the elastomeric material to harden.

This invention will be understood in greater detail by reference to the following portion of this specification where the drawings are described in detail and where the process is set forth in greater particularity.

Referring now to FIG. 2, the finished polishing and deburring wheel made in accordance with this process is generally indicated at 10. The wheel 10 comprises a wire wheel 12 which is impregnated with elastomeric material in accordance with this process. The wire wheel 12 has a hub 14. Hub 14 is formed of first and second hub elements 16 and 18. Each of these elements is in the form of a drawn cup and each of these elements is arranged so that the bottoms 20 and 22 are adjacent each other. Radially extending flanges 24 and 26 are formed on the cup rims. These flanges terminate in circular edges 27 and 29, which are circular about hole 28 formed in the bottoms 20 and 22 of the cups.

Hub 14 is arranged to be mounted upon hole 28 so that the polishing and deburring wheel 10 is rotated. Rotation takes place in the plane of the flanges 24 and 26, and since these flanges terminate in edges which are circular about the hole 28, these edges move circularly when the wheel is rotated. The hub elements 16 and 18, with their outwardly extending flanges 24 and 26, form an annular recess 30 which opens radially outwardly between the flanges. Secured between the flanges are a plurality of radially positioned wires 32. These wires may be secured in hub 14 by any conventional means, and conventional means include the bending of wires 32 around a main holding wire or annular ring. This wire is positioned between flanges 24 and 26 and the bulk of the material, including the holding wire and wires 32, causes the substantial filling of recess 30 so that the wires are all held firmly in place and extending in a radial direction with respect to hole 28.

It is well known in the art that wire wheels formed in the manner indicated at 12 are useable for some purposes. However, due to the deflection and bending of the wires 32 in heavier duty use, and the excess of wheel wear caused thereby, it is often more desirable to use a polishing and deburring wheel as indicated at 10 wherein the wires 32 are encased in elastomeric material. The process of this invention includes the injection of such elastomeric material.

Referring now to FIG. 3 an injection die set 46 is shown in which the wheel 12 is located for the injection of such elastomeric material. The die set includes a lower die 34, die ring 36 and upper die 38. Lower die 34 has a cylindrical recess 40 which is equal in diameter to the edge 29 of flange 26 and equal in depth to the thickness of the flange so that the circular edge 29 of the flange is completely accepted within recess 40 of lower die 34, and wires 32 lie against the planar face 42 thereof. Die ring 36 has a cylindrical interior opening 44 which corresponds in diameter to the outer circular diameter of the ends of the wires 32. Furthermore, die ring 36 corresponds in thickness to the axial width of annular recess 30 so that wires 32 are constrained in a right cylindrical die opening. Die ring 36 can be integrally formed with lower die 34, or may be a separate part. A separate part may be preferable so that the die structure generally indicated at 46 is versatile. By changing die ring 36, wheels 12 having the same hub 14 but having a different outer diameter may be readily accommodated.

Upper die 38 has a planar lower face 48 which meets with the top of die ring 36 when the die structure 46 is closed. Similar to recess 40 and lower die 34, upper die 38 has cylindrical recess 50 which accepts the flange 24 both as to diameter and thickness. By this means the wires 32 are constrained in their free areas to the right cylindrical opening formed in the die structure 46.

Upper die 38 is provided with chamber 52 which is in the right cylindrical form and has bottom wall 54 positioned adjacent recess 50. Injection plunger 56 is position within chamber 52 so that elastomeric material 58 positioned within chamber 52 may be compressed and injected. A plurality of injection holes, two of which are seen at 60 and 62, are positioned in upper die 38 and extend from the interior of chamber 50 to die face 48 so as to permit the material 58 to be injected in the cavity of die structure 46. The injection holes, as exemplified by injection holes 60 and 62, are positioned so that they enter through face 48 immediately outside of recess 60. Therefore, the elastomeric material 58 injected through the injection holes flows radially outward from the holes to fill the portion of the die cavity 46 in communication therewith. Flanges 24 and 26 close off the interior of the cavity so that none of the elastomeric material 58 moves into the area of cup bottoms 20 and 22 and hole 28. Thus, flow through the injection holes is limited primarily to a radially outward flow. In view of the fact that there are many such injection holes, little non-radial flow is needed in order to completely fill the cavity defined by die structure 46 and wheel 12. Since the wires 32 virtually fill the interior of annular recess 30, little of the elastomeric material 58 can be injected therein. Thus, the flow is very nearly all outwardly radial. This outwardly radial flow is important in the maintenance of accurate radially outward positioning of wires 32. Cross flow tends to displace these wires, and such cross flow thus moves them so that they are not uniformly positioned in the finished wheel 10.

The elastomeric material 58 is preferably rubber like, in that it is injectible by downward motion of injection plunger 56 when it is in the original state, but is vulcanizable or otherwise treatable so as to be relatively hard, yet elastomeric in the finished wheel condition.

The properties of elastomeric material 58 are very important with respect to the functioning of wheels constructed as herein described. Particularly suitable wheels have been formed using chloroprene polymers and copolymers of chloroprene with such vinyl compositions as isoprene and styrene. Various other elastomers such as are sold under the trade name "Hycar" (butadiene-styrene polymers and butadiene-acrylonitrile polymers) and are manufactured by Goodrich Chemical Corporation of Cleveland, Ohio, can also be employed with this invention. All of the elastomeric materials capable of being employed with this invention are comparatively flexible, and do not excessively smear the work or emit highly offensive odors under the normal operating conditions encountered during use of polishing and deburring wheels as herein described. Further, these elastomeric resins are substantially incapable of melting at the temperatures encountered during the use of such wheels of the invention.

A preferred injectable, curable mixture which results in a cured resilient elastomer having desirable properties for this application is shown below. This mixture in the uncured state contains:

| | Parts by weight |
|---|---|
| Neoprene GN-A (polymerized chloroprene produced by the Du Pont Corp., Wilmington, Del. | 100 |
| Magnesium oxide | 4 |
| Neozone "D" (phenyl-beta-naphthylamine, an antioxidant produced by the Du Pont Corporation, Wilmington, Del. | 2 |
| Permalux (di-o-tolyl guanidine salt of dicatechol borate, an activator produced by the Du Pont Corporation, Wilmington, Del. | 0.5 |
| Sodium acetate | 0.5 |
| Dutrex 30 (unsaturated hydrocarbon derived from acid petroleum sludge, a plasticizer produced by the Shell Oil Co., of Emeryville, Calif.) | 35.0 |
| Stearic acid | 1.0 |
| Zinc oxide | 5.0 |
| Red iron oxide | 1.0 |

Furthermore, it is some times desirable when a particularly good bond is desired between the wires 32 and the material injected around it to previously treat the wires 32 with a suitable aid to bonding. Very satisfactory results in producing wheels of the instant invention have been achieved by treating wire bristles attached to a hub with "Typly-S" (a black viscous rubber cement marketed as a bonding agent for vulcanizing synthetic elastomers to metal) produced by Marbon Corporation of Gary, Ind., by dipping these bristles in this composition and heating them at a temperature of 85° F. for a period of 30 minutes. Of course, this step is optional and precedes the positioning of the wheel 12 within the die structure 46 for injection of the elastomeric material 58.

Accordingly, the process of this invention comprises positioning of a suitable wire wheel 12, having a hub. The next step is the optional step of dipping the wires 32 of the wire wheel 12 into a bonding aid such as is mentioned above, together with a heat treatment desirable with such a bonding aid. The next step is placement of the wheel 12 within the die structure 46. The following step comprises the injection of elastomeric material 58 into the cavity and main wire 32 in such a manner that substantially radial flow of the elastomeric material with respect to the wheel 12 and resultant substantially parallel flow to the wires 32 is obtained so as to maintain the wires 32 in uniform, radial position. Such injection substantially fills the spaces around the wires with solid elastomeric material without substantial voids. Vulcanizing or otherwise hardening of the elastomeric material 58 is the next step. This is preferably done by heating to 285° F. for 30 minutes while the wheel 12 is positioned in the cavity in die structure 46. It should be alternatively noted that prevulcanizing conserves die time, and final vulcanizing can be completed outside of the die. Pre-vulcanizing must be sufficient to harden at least the surface of the elastomeric material so that it is self supporting between the period of removal from the die and final vulcanizing. A vulcanizable elastomeric material 58 is preferred because it does not melt at the polishing and deburring temperatures found at the exterior of wheel 10 when it is in use, so no smearing takes place but the elastomeric material wears away properly to divide a short length of wires 32 extending from the outer periphery thereof to enter into the polishing and deburring operation.

This invention having been described in its preferred process, it is clear that there are process modifications within the skill of the routine technician and without the exercise of the inventive faculty. Accordingly, this invention is defined by the scope of the following claims.

What is claimed is:

1. The process of producing a polishing and deburring wheel having impregnated elastomeric material comprising the steps of:

providing a wheel having a hub and having wires substantially radially extending from the hub, the hub having circular, radially extending flanges positioned to retain and restrain the substantially radially extending said wires;

providing an injection molding die which has a recess arranged so that the walls defining the recess engage the wheel flanges and in which the die recess periphery is circular so as to substantially engage the ends of the substantially radially positioned wires on the wheel;

positioning the wheel in the die so that the walls defining the recess engage upon the radially extending flanges of the hub of the wheel and the periphery of the recess substantially engages the ends of the substantially radially extending wires secured by the hub so that the hub aids in defining a molding die recess in which the wires are positioned;

injecting material which is elastomeric in its final form into the die recess at a plurality of points immediately outwardly adjacent the point where at least one of the flanges engages the wall defining the die recess so that injected material flows substantially radially with respect to the wheel and substantially parallel to the wires so as to prevent deflection of the hub held wires from a substantially radial position; and causing said material to assume its final form.

2. A process as claimed in claim 1 wherein said material is a material which becomes elastomeric as a result of thermohardening and wherein causing of said material to assume its final form comprises heating said wheel and the material positioned between the substantially radial wires within said mold so as to cause thermohardening of the injected material.

3. A process as claimed in claim 2 wherein the ultimate step therein comprises adding heat to the wheel and the material to a sufficient extent to cause partial thermohardening of the material positioned between the wires;

removing the wheel and partially thermoset material from the die; and adding heat to the wheel and the material so as to complete thermohardening of the material so that it is wholly in its elastomeric condition.

4. The process of claim 2 wherein:

the injection step includes the injection of vulcanizable, rubber-like material and the thermohardening step comprises vulcanizing the rubber-like material.

References Cited
UNITED STATES PATENTS

| | | | |
|---|---|---|---|
| 3,142,081 | 7/1964 | Hartz | 15—179 |
| 2,981,982 | 5/1961 | Pendorf | 264—276 |
| 2,950,495 | 8/1960 | Stingley | 264—243 |
| 3,076,219 | 2/1963 | Peterson | 15—179 |
| 2,663,908 | 12/1953 | Maier. | |

ROBERT F. WHITE, *Primary Examiner.*

R. B. MOFFITT, *Assistant Examiner.*